(12) United States Patent
Hiron et al.

(10) Patent No.: US 7,799,362 B2
(45) Date of Patent: Sep. 21, 2010

(54) FLAVOUR-ENHANCED FOOD COMPOSITION

(75) Inventors: Shelley Hiron, Winnipeg (CA); Sarah Medina, Winnipeg (CA)

(73) Assignee: Burcon Nutrascience (MB) Corp., Winnipeg, Manitoba (CA)

( * ) Notice: Subject to any disclaimer, the term of this patent is extended or adjusted under 35 U.S.C. 154(b) by 812 days.

(21) Appl. No.: 10/405,365

(22) Filed: Apr. 3, 2003

(65) Prior Publication Data

US 2004/0005395 A1    Jan. 8, 2004

Related U.S. Application Data

(60) Provisional application No. 60/372,166, filed on Apr. 15, 2002, provisional application No. 60/376,849, filed on May 2, 2002.

(51) Int. Cl.
  *A23L 1/22* (2006.01)
(52) U.S. Cl. ................. 426/533; 426/656; 426/534
(58) Field of Classification Search ............. 426/656; 530/370, 374
See application file for complete search history.

(56) References Cited

U.S. PATENT DOCUMENTS

| | | | |
|---|---|---|---|
| 4,169,090 A | | 9/1979 | Murray et al. |
| 4,208,323 A | | 6/1980 | Murray et al. |
| 4,285,862 A | | 8/1981 | Murray et al. |
| 4,418,013 A | * | 11/1983 | Cameron et al. ............. 530/377 |
| 5,844,086 A | | 12/1998 | Murray et al. |
| 6,005,076 A | | 12/1999 | Murray |
| 2007/0237877 A1 | * | 10/2007 | Diosady et al. ............. 426/598 |

FOREIGN PATENT DOCUMENTS

| | | |
|---|---|---|
| GB | 2 077 739 | 12/1981 |
| GB | 2077739 | * 12/1981 |

OTHER PUBLICATIONS

Morris, Charles. "New Technology Isolates Canola Protein". Food Engineering. Published May 1, 2001.*
Murray. Asia Pacific Food Industry. Published Apr. 2001. pp. 30-34.*
The Pantry: Gourmet. 2000. http://www.web.archive.org/web/20000302171244/www.gardenburger.com/the_pantry/gourmet2.html.*
Gardenburger. 2001. http://www.web.archive.org/web/20011019200653/gardenburger.com/shroom.asp.*
Journal of American Oil Chemists' Society. Mar. 1979. vol. 56. Author: Martinez. pp. 280-284.*
Merriam Webster Online Dictionary, 11$^{th}$ Edition. http://www.merriam-webster.com/dictionary/enhancement.*
Murray E D : "New Plant Protein Isolate" Food science and technology, academic press, US. vol. 15, No. 2, Jun. 2001, pp. 44-47. XP001127487.
Murray et al. "Rapeseed: a potential global source of high quality plant protein" Asia Pacific Food Industry, AP Trade Publications, Singapore. Apr. 2001, pp. 30-34 XP0022076606.

* cited by examiner

*Primary Examiner*—Anthony Weier
(74) *Attorney, Agent, or Firm*—Michael I. Stewart; Sim & McBurney

(57) ABSTRACT

Canola protein isolates are used to provide an enhancement of flavouring in food compositions. Such isolates may also replace functional components in such food compositions.

10 Claims, No Drawings

FLAVOUR-ENHANCED FOOD COMPOSITION

REFERENCE TO RELATED APPLICATIONS

This application claims priority pursuant to 35 USC 119(e) from U.S. Provisional Patent Applications Nos. 60/372,166 filed Apr. 15, 2002 and 60/376,849 filed May 2, 2002.

FIELD OF INVENTION

The present invention relates to a canola protein isolate (CPI) and its use as a flavour-enhancer in a food product.

BACKGROUND TO THE INVENTION

In U.S. Pat. Nos. 5,844,086 and 6,005,076 ("Murray II"), assigned to the assignee hereof and the disclosures of which are incorporated herein by reference, there is described a process for the isolation of protein isolates from oil seed meal having a significant fat content, including canola oil seed meal having such content. The steps involved in this process include solubilizing proteinaceous material from oil seed meal, which also solubilizes fat in the meal, and removing fat from the resulting aqueous protein solution. The aqueous protein solution may be separated from the residual oil seed meal before or after the fat removal step. The defatted protein solution then is concentrated to increase the protein concentration while maintaining the ionic strength substantially constant, after which the concentrated protein solution may be subjected to a further fat removal step. The concentrated protein solution then is diluted to cause the formation of a cloud-like mass of highly aggregated protein molecules as discrete protein droplets in micellar form. The protein micelles are allowed to settle to form an aggregated, coalesced, dense amorphous, sticky gluten-like protein isolate mass, termed "protein micellar mass" or PMM, which is separated from residual aqueous phase and dried.

The protein isolate has a protein content (as determined by Kjeldahl N×6.25) of at least about 90 wt %, is substantially undenatured (as determined by differential scanning calorimetry) and has a low residual fat content. The yield of protein isolate obtained using this procedure, in terms of the proportion of protein extracted from the oil seed meal which is recovered as dried protein isolate was generally less than 40 wt %, typically around 20 wt %.

The procedure described in the aforementioned patents was developed as a modification to and improvement on the procedure for forming a protein isolate from a variety of protein source materials, including oil seeds, as described in U.S. Pat. No. 4,208,323 (Murray IB). The oil seeds available in 1980, when U.S. Pat. No. 4,208,323 issued, did not have the fat contamination levels of canola oil seed meals, and, as a consequence, the procedure of U.S. Pat. No. 4,208,323 cannot produce from the current oil seed meals processed according to the Murray II process, proteinaceous materials which have more than 90 wt % protein content. There is no description of any specific experiments in U.S. Pat. No. 4,208,323 carried out using rapeseed (canola) meal as the starting material.

U.S. Pat. No. 4,208,323 itself was designed to be an improvement on the process described in U.S. Pat. Nos. 4,169,090 and 4,285,862 (Murray IA) by the introduction of the concentration step prior to dilution to form the PMM. The latter step served to improve the yield of protein isolate from around 20% for the Murray IA process.

In copending U.S. patent applications Ser. Nos. 60/288,415 filed May 4, 2001, 60/326,987 filed Oct. 5, 2001, 60/331,066 filed Nov. 7, 2001, 60/333,494 filed Nov. 28, 2001, 60/374,801 filed Apr. 24, 2002 and 10/137,391 filed May 3, 2002 (WO 02/089598), assigned to the assignee hereof and the disclosures of which are incorporated herein by reference, there are described further improvements on these prior art protein isolation procedures as they apply to oil seeds to obtain improved yields of dried product protein isolate in terms of the proportion of the protein extracted from the oil seeds which is recovered as protein isolate and to obtain a protein isolate of high purity, usually at least about 100 wt % at a Kjeldahl nitrogen (N) conversion rate of N×6.25. The procedure is employed particularly to produce a canola protein isolate.

In the procedure described in the aforementioned U.S. patent applications, the oil seed meal is extracted with an aqueous salt solution. The resulting protein extract solution, after an initial treatment with pigment adsorbing agent, if desired, is reduced in volume using ultrafiltration membranes to provide a concentrated protein solution having a protein content in excess of about 200 g/L. The concentrated protein solution then is diluted into chilled water having a temperature below about 59° F. (15° C.), resulting in the formation of a white cloud of protein micelles which are allowed to separate. Following removal of the supernatant, the precipitated PMM is dried.

In one embodiment of the process described in the aforementioned U.S. patent application Ser. No. 60/288,415 as it is applied to canola protein isolate and as also described in copending U.S. patent applications Ser. Nos. 60/326,987, 60/331,066 60/333,494, 60/374,801 and 10/137,391, the supernatant from the PMM settling step is processed to recover a protein isolate comprising dried protein from the wet PMM and supernatant. This may be effected by initially concentrating the supernatant using ultrafiltration membranes, mixing the concentrated supernatant with the wet PMM and drying the mixture. The resulting canola protein isolate has a high purity of at least about 90 wt % protein, preferably at least about 100 wt %, at a Kjeldahl conversion rate N×6.25.

In another embodiment of the process described in the aforementioned U.S. patent application Ser. No. 60/288,415 as it is applied to canola protein isolate and as also described in copending U.S. patent applications Ser. Nos. 60/331,066, 60/333,494, 60/374,801 and 10/137,391, the supernatant from the PMM setting step is processed to recover a protein isolate. This procedure may be effected by initially concentrating the supernatant using ultrafiltration membranes and drying the concentrate. The resulting canola protein isolate has a high purity of at least about 90 wt %, preferably at least about 100 wt % at a Kjeldahl conversion rate of N×6.25.

In copending U.S. patent applications Ser. Nos. 60/331,646 filed Nov. 20, 2001, 60/383,809 filed May 30, 2002 and 10/298,678 filed Nov. 19, 2002, assigned to the assignee hereof and the disclosures of which are incorporated herein by reference, there is described a continuous process for making canola protein isolates. In accordance therewith, canola oil seed meal is continuously mixed with a salt solution, the mixture is conveyed through a pipe while extracting protein from the canola oil seed meal to form an aqueous protein solution, the aqueous protein solution is continuously separated from residual canola oil seed meal, the aqueous protein solution is continuously conveyed through a selective membrane operation to increase the protein content of the aqueous protein solution to at least about 200 g/L while maintaining the ionic strength substantially constant, the resulting concentrated protein solution is continuously mixed with chilled water to cause the formation of protein micelles, and the protein micelles are continuously permitted to settle while the supernatant is continuously overflowed until the desired amount of protein micellar mass has accumulated in the settling vessel. The protein micellar mass is removed from the settling vessel and may be dried. The protein micellar mass has a protein content of at least about 100 wt % as determined by Kjeldahl nitrogen (N×6.25). As in the case of the aforementioned pending U.S. patent applications, the overflowed supernatant may be processed to recover a protein isolate comprising dried protein from the wet PMM and supernatant, dried supernatant or mixtures thereof. This procedure also may be effected on a semi-continuous basis.

As described in copending U.S. applications Ser. Nos. 60/332,165 filed Apr. 15, 2002 and 60/430,687 filed Nov. 4, 2002, assigned to the assignee hereof and the disclosures of which are incorporated herein by reference, the settled PMM and protein derived from the supernatant have different relative proportions of the 12S, 7S and 2S proteins of canola protein. The PMM derived protein isolate, having a protein content of at least about 90 wt %, preferably at least about 100 wt %, has a protein component content of about 60 to about 98 wt % of 7S protein, about 1 to about 15 wt % of 12S protein and 0 to about 25 wt % of 2S protein. The supernatant-derived canola protein isolate having a protein content of at least about 90 wt %, preferably at least about 100 wt %, has a protein component content of 0 to about 5 wt % of 12S protein, about 5 to about 40 wt % of 7S protein and about 60 to about 95 wt % of 2S protein.

Canola is also termed rapeseed or oil seed rape.

SUMMARY OF INVENTION

It has been surprisingly found that the high purity canola protein isolates described above can be used as a substitute, at least in part, for conventional functional proteins, such as egg and gelatin, in various food products, substituting for their functionality, and can provide an enhancement to flavour elements of the food product in comparison to the conventional functional protein.

Accordingly, in one aspect of the present invention, there is provided, in a food composition containing at least one component imparting flavour to the composition, the improvement which comprises incorporating a canola protein isolate in the food composition to provide an enhancement of flavour. Preferably, the canola protein isolate substitutes at least in part for a component providing functionality in the composition.

The ability to utilize a protein which is vegetable in origin in food products enables truly vegetarian food products to be provided in instances where egg, egg components and/or animal-derived proteins have been used in the absence of any available substitute. The broadly-based functionality of the PMM canola protein isolate is described in copending U.S. patent applications Ser. Nos. 60/288,434 filed May 4, 2001, 60/330,731 filed Oct. 29, 2001 and 10/137,306 filed May 3, 2002 (WO 02/089589), all assigned to the assignee hereof and the disclosures of which are incorporated herein by reference. The broadly-based functionality of the mixed PMM and supernatant-derived canola protein isolate is described in copending U.S. patent applications Ser. Nos. 60/330,479 filed Oct. 23, 2001, 60/375,711 filed Apr. 29, 2002 and 10/274,886 filed Oct. 22, 2002, assigned to the assignee hereof and the disclosures of which are incorporated herein by reference. The broadly-based functionality of the supernatant-derived canola protein isolate is described in copending U.S. patent applications Ser. Nos. 60/363,283 filed Mar. 12, 2002 and 60/383,773 filed May 30, 2002, assigned to the assignee hereof and the disclosures of which are incorporated herein by reference.

Many food products incorporate flavourings, including savoury, sweet and rich buttery flavours. According to the invention herein, high purity canola protein isolates can be used as a functional protein in such food products and provide an enhanced flavour to the food product, when compared to the conventionally used functional proteins.

Depending on the food composition, the canola protein isolate may be used to replace, at least in part, egg white, egg yolk, whole egg, gelatin or corn starch.

The canola protein isolate imparts a rich flavour to the food composition and an improved organoleptic mouthfeel. The ability to provide an enhanced flavour from flavouring components of a food composition enables the same level of flavour to be achieved from lesser amounts of flavouring components.

The canola protein isolate utilized herein and having a protein content of at least about 90 wt % (N×6.25), preferably at least about 100 wt %, may be any of the canola protein isolates prepared according to the procedures described above.

EXAMPLES

Example 1

This Example illustrates the preparation of a canola protein isolate, BW-AL011-J16-01A, for testing potential flavour enhancement.

1200 kg of commercial canola meal was added to 8000 L of 0.15 M NaCl solution at ambient temperature and agitated for 30 minutes to provide an aqueous protein solution having a protein content of 24.4 g/L. The residual canola meal was removed and washed on a vacuum filter belt. The resulting protein solution was clarified by centrifugation to produce a clarified protein solution having a protein content of 20.3 g/L.

The clarified protein solution was reduced in volume on an ultrafiltration system using 3000 dalton molecular cut-off membranes. The resulting concentrated solution had a protein content of 287 g/L.

The concentrated solution at 82.4° F. (28° C.) was diluted 1:10 into 39° F. (4° C.) water. A white cloud formed immediately and was allowed to settle. The upper diluting water was recovered and the precipitated PMM was removed from the bottom of the vessel and dried. The dried protein was found to have a protein content of 101.6 wt % (N×6.25) d.b.

The removed upper diluting water was reduced in volume by ultrafiltration using 3000 dalton molecular weight cut-off membranes to a protein concentration of 265 g/L. The concentrate then was dried. The dried concentrate which was formed had a protein content of 101.5 wt % (N×6.25) d.b. The PMM-derived and supernatant-derived canola protein isolates were given product designation BW-AL011-J16-01A-C300 and -C200 respectively.

Example 2

This Example illustrates the preparation of canola protein isolates A9-13 and A10-05, for testing potential flavour enhancement.

'a' kg of commercial canola meal was added to 'b' L of 0.15 M NaCl solution at ambient temperature, agitated 'c' minutes to provide an aqueous protein solution having a protein content of 'd' g/L. The residual canola meal was removed and washed on a vacuum filter belt. The resulting protein solution was clarified by centrifugation to produce a clarified protein solution having a protein content of 'e' g/L followed by the addition of 1 wt % Powdered Activated Carbon (PAC).

The protein extract solution from the PAC treatment step was reduced in volume on an ultrafiltration system utilizing 30,000 (A9-13) or 50,000 (A10-05) dalton molecular weight cut-off membranes. The resulting concentrated protein solution had a protein content of 'f' g/L.

The concentrated solution at 'g'° C. was diluted 1:'h' into 39° F. (4° C.) water. A white cloud formed immediately and was allowed to settle. The upper diluting water was removed and was reduced in volume by ultrafiltration using a 3,000 dalton membrane by a volume reduction factor of 'i'. The concentrate was added to the precipitated, viscous, sticky mass and the mixture was dried. The dried protein which was formed had a protein content of 'j' wt % of protein (N×6.25) d.b. The product was given designation 'k'.

The specific parameters 'a' to 'k' for the two different samples of protein product are set forth in the following Table I:

TABLE I

| k | a | b | c | d | e | f | g | h | i | j |
|---|---|---|---|---|---|---|---|---|---|---|
| A9-13 | 300 | 2000 | 30 | 20.4 | 18.8 | 219 | 20 | 10 | 12 | 99.3 |
| A10-05 | 300 | 2000 | 30 | 27.7 | 21.9 | 281 | 27 | 15 | 21 | 102.3 |

Example 3

This Example illustrates the preparation of canola protein isolate BW-AL016-J24-01A-C200, for testing potential flavour enhancement.

1200 kg of commercial canola meal was added to 8000 L of 0.15 M NaCl solution at ambient temperature and agitated for 30 minutes to provide an aqueous protein solution having a protein content of 22.7 g/L. The residual canola meal was removed and washed on a vacuum filter belt. The resulting protein solution was clarified by centrifugation to produce a clarified protein solution having a protein content of 16.9 g/L.

The clarified protein solution was reduced in volume on an ultrafiltration system using 3,000 dalton molecular weight cut-off membrane. The resulting concentrated solution had a protein content of 281.0 g/L.

The concentrated solution at 98.6° F. (37° C.) was diluted 1:10 into 39° F. (4° C.) water. A white cloud formed immediately and was allowed to settle. The upper diluting water was removed and was reduced in volume by ultrafiltration using a 3,000 dalton molecular weight cut-off membrane by a volume reduction factor of 16. The concentrate was dried. The dried protein which was formed had a protein content of 103.9 wt % of protein (N×6.25) d.b. The product was given designation BW-AL016-J24-01A-C200.

Example 4

This Example illustrates the use of a canola protein isolate in a mushroom burger.

A mushroom burger was prepared in which a canola protein isolate (A9-13) prepared as described above in Example 2, was used in place of whole egg in the formulation shown in the following Table II:

TABLE II

| Ingredient | Weight (g) | Percentage (%) |
|---|---|---|
| Mushrooms, diced | 171.0 | 51.6 |
| Canola oil | 10.9 | 3.3 |
| Onion, minced | 50.2 | 15.2 |
| Bread crombs | 53.4 | 16.1 |
| CPI A9-13 | 4.7 | 1.4 |
| Water for CPI | 34.8 | 10.5 |
| Salt | 1.1 | 0.3 |
| Ground Pepper | 0.3 | 0.1 |
| Garlic clove, crushed | 5.1 | 1.5 |
| Total | 331.5 | 100.0 |

The onion and garlic were sauteed in oil for 2 minutes (setting 3 to 4). The mushrooms were added and cooked, stirring frequently, until softened and all liquid had disappeared (6 minutes at setting 5). The mixture was cooled. The water was mixed with the salt and the canola protein isolate mixed in and permitted to set for 15 minutes to permit rehydration of the protein. All ingredients then were combined and patties formed. One patty was cooked in a frying pan at setting 2 to 3 to an internal temperature of >165° F. (>74° C.) for approximately 2 minutes per side. Another patty was cooked over medium heat on a bar-b-que for 10 minutes per side.

The cooked burgers were taste tested in comparison to mushroom burgers prepared using whole shell egg rather than the canola protein isolate. The mushroom burgers prepared as described in this Example had an enhanced savoury and pepper flavour in comparison to the shell egg control.

Example 5

This Example further illustrates the use of a canola protein isolate in a mushroom burger.

The procedure of Example 4 was repeated except that the canola protein isolate was BW-AL016-J24-01A-C200, prepared as described in Example 3, rather than the canola protein isolate A9-13. The cooked burgers were taste tested in comparison to mushroom burgers prepared using whole shell egg. The mushroom burgers prepared as described in this Example had an enhanced onion and pepper flavour in comparison to the shell egg control.

Example 6

This Example illustrates the use of a canola protein isolate in a caramel sauce.

A caramel sauce was prepared in which a canola protein isolate (A10-05) prepared as described in Example 2, was used in place of modified corn starch in a formulation shown in the following Table III

TABLE III

| Ingredient | Weight (g) | Percentage (%) |
|---|---|---|
| 2% Evaporated milk | 407.6 | 65.6 |
| CPI A10-15 | 10.9 | 1.8 |
| Brown sufar | 75.6 | 12.2 |
| White sugar | 106.3 | 17.1 |
| Margarine | 15.0 | 2.4 |
| Vanilla extract, pure | 5.9 | 0.9 |
| Total | 621.3 | 100.0 |

The canola protein isolate and sugars were dry-blended. Evaporated milk was gradually blended into the dry blend. The resulting mixture was added to the saucepan with the margarine and vanilla. The mixture was stirred and cooked over a double boiler to 190° F. (88° C.) and held for 5 minutes, then cooled to 41° F. (5° C.).

The caramel sauce had a richer darker colour than the control formula made with modified corn starch. The caramel sauce was taste tested and found to be very flavourful with an enhanced caramel flavour.

Example 7

This Example illustrates the use of a canola protein isolate in a nougat.

A light candy nougat was prepared in which a canola protein isolate (A9-13), prepared as described in Example 2, was used in place of egg albumen in a formulation shown in the following Table IV:

TABLE IV

| Ingredient | Weight (g) | Percentage (%) |
|---|---|---|
| Sufar | 655.6 | 47.7 |
| Corn syrup, light | 338.4 | 24.6 |
| Water (1) | 226.3 | 16.5 |
| CPI A9-13 | 11.7 | 0.8 |
| Water (2) | 85.5 | 6.2 |
| Chocolate chips | 56.7 | 4.1 |
| Salt | 0.5 | 0.1 |
| Total | 1374.7 | 100.0 |

Canola protein isolate, protein, water (2) and salt were whipped for 1 minute at speed 1 then 3 minutes at speed 3 using a whisk attachment in a Hobart bowl mixer and refrigerated until required. A rubber spatula, the inside of a large saucepan, and a cake pan were coated with PAM spray. The sugar, corn syrup and water (1) were added to the saucepan and the mixture brought to a boil over medium heat. The mixture was covered and boiled for 3 minutes. The cover was removed and the sides of the saucepan were washed down using a pastry brush dipped in cool water. Cooking and stirring were continued until a temperature of 270° F. (130° C.) was reached. The temperature was measured by tilting the pot and measuring the temperature of the solution. The saucepan was removed from heat and the solution in the saucepan was cooled on a cooling rack to 260° F. (125° C.). The hot mixture was poured over the beaten protein mixture while blending using the paddle attachment at speed 1 for 3 minutes. Blending of the mixture was continued for an additional 16 minutes. Chocolate chips were added while blending for 1 minute at speed 1 to permit the chips to melt into mixture. The mixture was transferred to the cake pan and molded flat to ¾ inch height and frozen. The frozen sheet was cut into squares and frozen on a baking sheet. The frozen nougat squares were placed in a freezer bag for storage.

The nougat had a creamy appearance and a golden caramel colour. The texture was smooth, chewy and soft. The nougat had a sweet taste and no off odours.

The candy nougat control made using egg albumen had a milder, less pronounced flavour than the nougat made using canola protein isolate A9-13. The A9-13 gave it an enhanced chocolate and coffee-like flavour and richness in comparison to the control.

Example 8

This Example illustrates the use of a canola protein isolate in an egg custard flan.

An egg custard flan was prepared in which a canola protein isolate (BW-AL011-J16-01A-C300), prepared as described in Example 1, was used in place of whole shell egg in a formulation shown in the following Table V:

TABLE V

| Ingredient | Weigvht (g) | Percentage (%) |
|---|---|---|
| CPI BW-AL011-J16-01A-C300 | 21.4 | 3.6 |
| Water | 93.8 | 15.7 |
| Sugar | 70.5 | 11.8 |
| Salt | 0.8 | 0.1 |
| Vanilla extract, pure | 4.4 | 0.7 |
| Evaporated milk (2%) | 407.6 | 68.1 |
| Sugar | For carmelizing | |
| Total | 598.5 | 100.0 |

The protein powder, salt and water were placed in a Hobart bowl and blended for 2 minutes at speed 2. The blending was stopped after 1 minute, the sides and bottom of the bowl were scraped and then mixing resumed. Sugar was added and blended for 1 minute at speed 2. The sides and bottom of the bowl were scraped to ensure even mixing. The milk and vanilla then were blended in for 1 minute at speed 2.

A caramelized sugared baking pan was prepared by heating sugar in a small saucepan until it melts and turns light golden brown. The caramelized sugar was quickly poured into the bottom of a small baking pan and the pan tilted to cover the bottom surface of the pan with caramelized sugar.

The blend then was poured into the caramelized sugared baking pan which then was placed into a larger pan filled with hot water. The water should reach halfway up to the smaller baking pan. The mixture was baked in an oven at 350° F. (177° C.) for 60 minutes. The pan then was removed from the oven and the baked custard turned upside down onto a plate and excess caramelized sugar drizzled on top.

The egg custard flan was taste tested in comparison to an egg custard prepared using whole shell egg rather than the canola protein isolate. The egg custard flan prepared as described in this Example had a sweet, milky flavour and flavour notes complementary to caramelized sugar and cooked milk. The flavours were much more pronounced in the egg custard flan made using canola protein isolate BW-AL011-J16-01A-C300 than they were in the control made using whole shell egg.

Example 9

This Example illustrates the use of a canola protein isolate in an egg custard flan.

The procedure of Example 8 was repeated except that a different canola protein isolate (A10-05), prepared as described in Example 2, was used in place of the canola protein isolate BW-AL011-J16-01A-C300. The flan prepared using the canola protein isolate was more flavourful than the control made using whole shell egg.

Example 10

This Example further illustrates the use of a canola protein isolate in an egg custard flan.

The procedure of Example 8 was again repeated using a blend of canola protein isolate A10-05 and whole shell egg. The formulation used is shown in the following Table VI:

TABLE VI

| Ingredient | Weight (g) | Percentage (%) |
|---|---|---|
| CPI A10-05 | 10.7 | 1.8 |
| Whole shell egg | 57.6 | 9.6 |
| Water | 46.9 | 7.9 |
| Sugar | 70.5 | 11.8 |
| Salt | 0.8 | 0.1 |
| Vanilla extract, pure | 4.4 | 0.7 |
| Evaporated milk (2%) | 407.6 | 68.1 |
| Sugar | For carmelizing | |
| Total | 598.4 | 100.0 |

The procedure employed was that described in Example 8, with the eggs being placed in the Hobart bowl along with the protein powder, salt and water.

The egg custard flan produced was taste tested and found to have a milky flavour and a rich, full-bodied egg flavour when compared to the whole shell egg control.

SUMMARY OF DISCLOSURE

In summary of this disclosure, the present invention provides novel food products in which high purity canola protein isolates enhance the flavour of the food products. Modifications are possible within the scope of the invention.

What we claim is:

1. In a food composition containing at least one component imparting flavour to the composition, the improvement which comprises incorporating into the food composition a canola protein isolate having a protein content of at least about 100 wt % (as determined by Kjeldahl N×6.25) on a dry weight basis to provide to the food composition an enhancement of flavour imparted by the at least one flavour imparting component.

2. The composition of claim 1 wherein said canola protein isolate substitutes at least in part for a component providing functionality in the composition.

3. The composition of claim 2 wherein said component providing functionality is egg white, egg yolk, whole egg, gelatin or corn-starch.

4. The composition of claim 1 wherein said canola protein isolate is a dried settled canola protein micellar mass.

5. The composition of claim 1 wherein said canola protein isolate is a dried mixture of settled canola protein micellar mass and concentrated supernatant from the settling of the protein micellar mass.

6. The composition of claim 1 wherein said canola protein isolate is a dried concentrated supernatant from the settling of a canola protein micellar mass.

7. The composition of claim 1 wherein said food composition is a mushroom burger.

8. The composition of claim 1 wherein said food composition is a caramel sauce.

9. The composition of claim 1 wherein said food composition is a nougat.

10. The composition of claim 1 wherein said food composition is an egg custard flan.

* * * * *